2,883,404

PREPARATION OF 21-HYDROXY STEROIDS

Virgil W. Gash and Bernard S. Wildi, Dayton, Ohio, assignors to Monsanto Chemical Company, St. Louis, Mo., a corporation of Delaware No Drawing. Application March 7, 1956
Serial No. 569,978

9 Claims. (Cl. 260—397.47)

It is an object of the present invention to provide a convenient, efficient method for converting steroids of the pregnane-20-one series to their pregnane-21-ol-20-one derivatives which have valuable therapeutic properties.

The present invention is directed to new and useful methods of preparing 20,21-dihydroxy steroid compounds and 20-keto-21-hydroxy steroid compounds.

The novel methods of preparing these steroid compounds involve the treatment of a steroid containing a 17β-acetyl group with an aromatic aldehyde to form a 21-arylidene steroid, and the ozonization of the 21-arylidene steroid followed by decomposition or hydrolysis under reductive conditions to form a 20,21-dihydroxy steroid. This dihydroxy steroid is then converted by selective oxidation, e.g., Oppenauer oxidation, to a 20-keto-21-hydroxy steroid. The foregoing procedure provides a convenient and valuable means for converting steroids of the pregnane 20-one series to 20-one-21-ol steroids.

The above-described procedure also provides a new and valuable method for converting 17β-acetyl steroids to 20,21-diol steroids.

The procedure of ozonizing a 21-arylidene steroid and decomposing the ozonide under reductive conditions is a novel method for preparing 20,21-diol steroid compounds.

The methods of the present invention can be illustrated by the following reactions in which A represents a steroid nucleus linked by the 17 carbon atom, and in which R represents an aromatic radical.

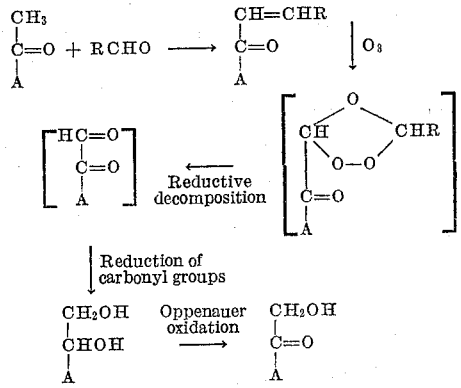

It should be noted that the hypothesized ozone structure above is not necessarily the true structure, but the reaction goes through an ozonide regardless of what its true structure may be.

While the term arylidene, meaning primarily substituted or unsubstituted benzylidene or naphthal radicals, will be used for convenience herein to designate the group RCH=, it will be recognized that other carbocyclic groups or heterocyclic groups such as the furfurylidene group can be used in place of the benzylidene group, and the term furfurylidene can be substituted wherever arylidene appears herein.

In the practice of our invention it is necessary that the decomposition of the ozonide take place under reductive conditions; this decomposition is often referred to as hydrolysis under reductive conditions. If reductive conditions are not used, the oxygen formed by decomposition of the ozonide will form hydrogen peroxide by combining with any water present, and will oxidize the steroid compound to an etianic acid. The conditions necessary for reductive decomposition of ozonides are well known to the art; see Gilman, "Organic Chemistry," page 636, 2nd ed., John Wiley and Sons, New York (1943); Long, Chem. Reviews 27, 452–454 (1940); and Church et al., J. Am. Chem. Soc. 56, 176–184 (1934).

Steroids containing a 20-keto and a 21-hydroxyl group are known compounds of valuable therapeutic uses. For example, desoxycorticosterone is produced by applying the procedure of the present invention to pregnenolone. Moreover, the 20-keto-21-hydroxyl steroids have been prepared heretofore from 17β-acetyl steroids, but by the use of other and less desirable procedures involving halogenation, dehalogenation, etc.

The 20,21-dihydroxy steroids prepared by the procedure of the present invention are also known compounds. These compounds are not only useful as intermediates, but they have also been reported to have therapeutic activity.

The procedure of the present invention is broadly applicable to steroids of the pregnane-20-one series, i.e., steroids which possess a 17β-acetyl group. The pregnane-20-one series is considered to include cyclopentano-10,13-dimethylpolyhydrophenanthrenes having hydroxyl, keto, oxo, or halogen substituents, on the steroid nucleus, or double bonds in the steroid nucleus, so long as they do not interfere with the desired reactions. In some cases it will be desirable to protect functional groups during the ozonization procedure in order to avoid degradation. For example, it is known that $\Delta^4$-3-keto steroids can be cleaved to keto acids by ozonization procedures, particularly when the ozonide is decomposed under oxidizing conditions. In such cases, careful ozonization at low temperatures and avoiding any undue excess of ozone will prevent substantial degradation. Ordinarily, the ozonization will require at least slightly over 1 mole of ozone per mole of steroid, after allowing for the loss of some ozone through reaction with the solvent. However, in order to avoid a mixture of products, it is usually desirable to protect such groups as a $\Delta^4$-3-keto group during the ozonization. Moreover, in most cases it will not be desirable to use a $\Delta^4$-3-keto steroid as a 3-hydroxy-$\Delta^5$ steroid will give the same result, for an Oppenauer oxidation will convert the $\Delta^5$-3-hydroxy group to a $\Delta^4$-3-keto group simultaneously with the conversion of the 20-hydroxy group to the 20-keto group. The $\Delta^5$ group is not usually susceptible to ozonization.

Alternatively, the keto group can be protected by ketalization, by reacting it with ethylene glycol. Double bonds can be protected by halogenation; for example a $\Delta^4$ or $\Delta^5$ group can be brominated, and the bromine can be removed by known methods after the ozonization. In fact, the debromination can be accomplished simultaneously with the reductive decomposition, by the use of such agents as zinc and acetic acid.

A keto group in the 3-position has some tendency to interfere in the reaction with an aromatic aldehyde, making it desirable to mask this keto group during this procedure, although some 21-arylidene product can be obtained without such precautions. Other keto groups, e.g., the 11-keto group, have no tendency to interfere in the reaction with the aromatic aldehyde, or in the ozonization reaction.

The following examples illustrate several specific embodiments of our invention.

Example 1

A solution of 0.22 gram of benzaldehyde and 0.489 gram of 3β-acetoxyallopregnan-20-one in 10 ml. of dry methanol was mixed with 2 ml. of a 3 N methanolic sodium methoxide solution. The flask was flushed with nitrogen, stoppered and kept at room temperature for six days. The solution was diluted with ice water, then filtered and the product was washed with sodium bisulfite solution, then water, and dried at 60° C. yielding 0.50 gram of 3β-hydroxy-21-benzylidene-allopregnan-20-one, M.P. 90–105° C. The product was dissolved in a solution of 3 ml. acetic anhydride and 3 ml. dry pyridine and kept at room temperature for 24 hours. The solution was hydrolyzed with ice water and filtered to yield 0.54 gram of 3β-acetoxy-21-benzylidene-allopregnan-20-one, M.P. 124–130° C., for an overall yield of 88%. Two recrystallizations from methanol gave a sample of M.P. 140–144° C.

*Analysis.*—Calc'd. for $C_{30}H_{40}O_3$: C, 80.31; H, 8.99. Found: C, 80.61; H. 9.37.

A solution of 0.1278 gram of 3β-acetoxy-21-benzylidene-allopregnan-20-one in 150 ml. purified chloroform was placed in a gas dispersion bottle and cooled with a Dry Ice-acetone bath. A stream of oxygen containing approximately 2% ozone by volume was bubbled through the solution until a slight blue color indicated an excess of ozone. The solution was flushed with oxygen to remove excess ozone, then 100 ml. of acetic acid and 10 grams of zinc dust were added. After standing at room temperature overnight, the solution was filtered, diluted with 100 ml. of acetic acid, and evaporated to about 150 ml. under water pump vacuum. Powdered zinc, 10 grams, was added and the solution was heated at 50° C. for one hour, then filtered and evaporated to near dryness. Dilution with excess water gave a light brown solid which was dissolved in ethanol and reprecipitated by addition of water, to give 0.0576 gram of a tan powder, M.P. 102–110° C. The product exhibited no maxima in the ultraviolet region. Infrared analysis showed acetate absorption at 5.79μ and the absence of any other carbonyl or double bond absorption; there was a well-defined hydroxyl absorption band at 2.85μ. This spectral analysis shows the product to be allopregnan-3β,20,21-triol-3-acetate.

Example 2

Pregnenolone, 2 grams (0.0063 mole), 0.85 gram (0.008 mole) benzaldehyde, and 10 ml. of 3 N sodium methoxide in methanol were added to 20 ml. methanol and allowed to stand for four days at room temperature under a nitrogen atmosphere in a stoppered flask. The methanol solution containing some solid precipitate was then poured into excess water, and the product was extracted with chloroform and the chloroform extract was washed successively with dilute acetic acid, water, sodium bisulfite solution, water, sodium bicarbonate solution and water. The chloroform solution was dried and the chloroform was removed leaving a viscous residue. The viscous oil crystallized upon standing overnight at room temperature to yield 2.7 grams of a pale yellow product. The material was recrystallized from aqueous ethanol to give white crystals, M.P. 120–126° C. Further recrystallization gave a melting point of 122–125° C. Spectral absorption data indicated that the product was 21-benzylidene pregnenolone, as infrared analysis showed a hydroxyl band at 3.0μ, and α,β-unsaturated ketone group at 6.0μ and 6.11μ, and a phenyl group at 6.24μ. Ultraviolet analysis showed $$\lambda_{max}^{EtOH} 290\ m\mu,\ \log \epsilon\ 4.33$$

*Analysis.*—Calc'd. for $C_{28}H_{36}O_2 \cdot H_2O$: C, 79.58%; H, 9.06%. Found: C, 79.64%, H, 9.57%.

The 21-benzylidene pregnenolone, 1.13 grams, was dissolved in 5 ml. dry pyridine and 5 ml. acetic anhydride was added and the solution was allowed to stand at room temperature in a stoppered flask for three days. The solution was diluted with water and filtered to give 1.22 grams of 21-benzylidene pregnenolone-3-acetate as cream-colored crystals, M.P. 169–175° C., a yield of 98%.

Example 3

A 4.6 gram amount of pregnenolone was converted to 21-benzylidene pregnenolone-3-acetate by reaction with benzaldehyde and acetic anhydride according to the procedure of Example 2. The product was dried to constant weight at 75° C., the 6.43 grams of cream-colored crystals having a melting point of 173–180° C.

A 6.03 gram (0.0135 mole) amount of 21-benzylidene pregnenolone-3-acetate prepared according to the above procedure was dissolved in 150 ml. chloroform and cooled in a Dry Ice-acetone bath. Bromine, 2.2 grams (0.0138 mole) dissolved in 20 ml. chloroform was added dropwise in 20 minutes to the cold, stirred steroid solution. The solution was warmed gradually to 0° C. and aqueous sodium sulfite was added to destroy excess bromine. The chloroform layer was separated and washed with distilled water, dried over $MgSO_4$ and evaporated to dryness under water pump vacuum without the application of heat. The residue (nearly white powder) weighed 8.3 grams, M.P. 138–144° C. Two recrystallizations from aqueous acetone gave silvery needles, M.P. 154–155° C. (dec.).

*Analysis.*—Calc'd. for $C_{30}H_{38}Br_2O_3$: C, 59.41; H, 6.32. Found: C, 59.65; H, 6.44.

Infrared analysis indicated an acetate group at 5.79μ and 8.09μ, α,β-unsaturated carbonyl at 5.95μ and 6.08μ, and a phenyl group at 6.2μ and 6.35μ. Ultraviolet analysis gave a $$\lambda_{max}^{alc} 292\ m\mu,\ \log \epsilon\ 4.43$$

A 0.42 gram sample (0.7 millimole) of the above 3β-acetoxy-21-benzylidene-5,6-dibromopregnan-20-one was added to 375 ml. of chloroform containing 144 mg. (3 millimoles) of ozone by titration. After standing for 30 minutes at Dry Ice temperature, the solution was evaporated to near dryness under reduced pressure. Glacial acetic acid (50 ml.) and powdered zinc were added, and the mixture was warmed on the hot water bath for 1 hour. The solution was filtered, diluted with excess water and extracted with ether. The solution was washed with bicarbonate solution and water, dried and stripped of solvent to leave a yellow oil. Infrared analysis showed absorption bands at 5.81μ, 8.11μ (acetate); 2.89μ (hydroxyl); 5.87μ (carbonyl); 6.04μ and 6.19μ (α,β-unsaturated carbonyl), indicating that the desired Δ⁵-pregnen-3β-20,21-triol 3-acetate product is present but contaminated with a 21-benzylidene steroid due to incomplete ozonization.

Example 4

Chloroform, 486 ml., was saturated with ozone, 115.2 mg. (0.0024 mole) at −7° C. 21-benzylidenepregnenolone 3-acetate, 1 gram (0.00226 mole) dissolved in 15 ml. carbon tetrachloride was added and the solution was allowed to stand for 10 minutes, the blue color being discharged almost immediately. Powdered zinc, 6 grams, and 50 ml. acetic acid were added and the solution stood overnight. The mixture was filtered and the filtrate was distilled at water pump vacuum to remove carbon tetrachloride. The residue was diluted with water and extracted with ether. The combined ether extracts were washed and dried, and the ether was removed to leave a viscous material which solidified upon standing. The material was dissolved in hot methanol and placed in the refrigerator. Solids which formed were removed by filtration and were identified as the starting material by analysis. The methanol solution filtrate was diluted with water and extracted with chloroform. The chloroform extract was extracted three times with 30 ml. portions of 2% aqueous potassium hydroxide. The combined aqueous extracts were washed with chloroform, then acidified with concentrated hydrochloric acid to give a product of melting point 207–217° C. (dec.). The product was recrystallized from acetone-benzene to give a nearly white powder of M.P. 232–236° C. Infrared analysis showed a broad hydroxyl band at 2.96μ, a carboxylic acid carbonyl band at 5.82μ, and carbonyl at 5.43μ, indicating that the product was 3-acetoxy-$\Delta^5$-pregnen-20-ol-21-oic acid. It appears that in this case merely standing with zinc and acetic acid was not sufficient to prevent oxidation to an acid, but that forcing reductive conditions, e.g., heating with the zinc and acetic acid, should have been used to insure reduction of the intermediate to the 20,21-diol. However, the 20-ol-21-oic acid is of interest itself for its anti-inflammatory and therapeutic properties, and is also of value as an intermediate for preparing the 20-one-21oic acid, which has anti-inflammatory and therapeutic properties, by an Oppenauer oxidation.

The ozonization conditions can vary considerably according to the properties of the particular steroid to be ozonized. If the steroid nucleus contains no groups which are sensitive to ozonization, it will be desirable to use a considerable excess of ozone, such as 3 to 5 moles per mole of steroid, in order to cause complete ozonolysis of the starting steroid derivative at the $\Delta^{21}$ position. If the steroid nucleus contains groups sensitive to ozonization, it will be desirable to use only 1 mole or a slight excess over 1 mole per mole of the 21-arylidene steroid derivative in order to avoid degradation, although it may result in incomplete conversion of the 21-arylidene steroid to the 20,21-dihydroxy steroid.

Low temperatures are ordinarily used for ozonization procedures in order to improve the solubility of the ozone in the reaction solvent. In the present invention, temperatures from the temperature of Dry Ice (−78.5° C.) to 0° C. are ordinarily used. However, higher temperatures, such as up to +10° C., or even +30° C. can be used. The ozonization reaction is usually permitted to continue until the blue ozone color appears in or disappears from the reaction medium, depending upon whether the ozone is added to a steroid solution, or a steroid solution is added to a solution of ozone. Ordinarily a reaction time of 5 to 30 minutes is sufficient, although the reaction mixture can sometimes be allowed to stand for an hour or more.

The usual ozonization solvents can be used in our invention, e. g., chloroform, carbon tetrachloride, mixtures of chloroform and carbon tetrachloride, methylene chloride, glacial acetic acid, ethyl acetate, etc., can be used, although chloroform and carbon tetrachloride are preferred. The steroid compound can be added to a solution containing the ozone, or the ozone can be bubbled into a solution of the steroid; in the latter case, a stream containing 1 to 2% ozone is usually used because that is the concentration supplied by a commercial ozonator, although concentrations up to 6%, or even up to 15% or more can be used. It is desirable to ozonate the steroid in a dilute solution, such as 1 gram of steroid per 200 to 1500 ml. of solvent. In some cases an amount of solvent is selected which is just sufficient to dissolve the required amount of ozone at the selected reaction temperature.

As recognized by those skilled in the art, the conditions under which the ozonide is decomposed have an important effect upon the products which are obtained. In our invention it is necessary that the ozonide be decomposed under reductive conditions. The conditions necessary for reductive decomposition are well known. For example, the decomposition can be conducted in the presence of a metal and an acid, or in the presence of molecular hydrogen and a hydrogenation catalyst, although the latter procedure will also hydrogenate any double bonds in the steroid nucleus. However, it should be noted that the prior art reductive decomposition procedures are usually applied to obtain a diketone, a dialdehyde, or a glyoxal, while our product is a 20,21-diol. Therefore, in our procedure it is sometimes desirable to use forcing reductive conditions, i.e., heat, long reaction times, powerful or selective reducing agents, particularly those known to reduce carbonyl groups, etc., in order to insure reduction of the intermediate glyoxal to the 20,21-diol. Thus, when using zinc and acetic acid, it is preferred to heat to around 40 to 70° C. for a short time, e.g., 20 minutes to 3 hours. Or, a selective reducing agent, such as lithium aluminum hydride, can be added to insure reduction of the glyoxal intermediate to the 20,21-diol compound. Of course, lithium aluminum anhydride will also reduce other unprotected keto groups in the molecule, e.g., an 11-keto group is reduced to an 11-hydroxyl group. Other reducing agents which can be used are sodium or magnesium in the presence of a hydrogen donor such as an acid, alcohol, or water; potassium ferrocyanide, and sodium bisulfite. It is also possible to decompose the ozonides by hydrogenation in the presence of a catalyst, such as platinum, palladium, nickel, Raney nickel, and copper chromite. If such hydrogenation is contemplated, it is preferable to use a solvent such as ethyl acetate for the ozonolysis, as the hydrogenation cannot be conducted effectively in halogenated solvents. Immediately after the ozonolysis, a small amount of a metal catalyst, such as palladium on calcium carbonate (5 parts palladium to 95 parts calcium carbonate), can be added and the mixture can be shaken under 1 to 5 atmospheres of hydrogen for about 1 to 10 hours. If the reaction does not start at room temperature, it may be necessary to warm the mixture slightly, but once the exothermic reaction starts, cooling with an ice bath is usually necessary to prevent a rise in temperature with possible formation of acids.

When zinc and acetic acids are used, it is only necessary to treat a dilute solution of the ozonide in glacial acetic acid with an excess of zinc powder, shaking it for 5 to 10 minutes with the powder, or allowing it to stand overnight. However, it is preferred to warm the mixture after initial treatment in order to insure production of the desired 20,21-diol.

It appears probable that in our procedure the ozonides upon decomposition are converted to a glyoxal intermediate, but we do not wish to be bound by any theory of the mechanism of our reaction, as the ozonides may go through some other intermediate or be converted to the 20,21-diol by some other mechanism in the presence of the reducing agents.

For the formation of the 21-arylidene compound, any aromatic aldehyde can be used; it is only necessary to have an aldehyde containing no hydrogen substituents on the α-carbon atom, and containing no interfering substituents. Among the aldehydes which can be used are benzaldehyde, α-naphthaldehyde, β-naphthaldehyde, furfuraldehyde, and substituted benzaldehydes, such as o-, m- or p-methylbenzaldehydes, p-methoxybenzaldehyde, etc. Ordinarily, however, there is no reason for using any aldehyde other than benzaldehyde, as the aldehyde does not form part of the final product. The aromatic aldehydes which can be used include both carbocyclic and heterocyclic compounds containing aromatic unsaturation. The reaction of aromatic aldehydes with 20-keto steroids to produce 21-benzal-20-keto steroids is known to the art, as shown by Marker et al., Jour. Amer. Chem. Soc., vol. 64, page 1282 (1942), and the conditions used by Marker et al. can be used in preparing the 21-arylidene compounds for use in the procedure of the present invention. The reaction involves a Claisen-Schmidt type condensation, i.e., an aldol type condensation, followed by dehydration to produce the unsaturated arylidene compound. The reaction is usually conducted in the presence of a catalyst, preferably an alkaline catalyst such as alkalies, sodium hydroxide, alkaline salts or organic acids, and metal alkoxides. The most suitable catalysts are usually sodium or potassium methoxides or ethoxides in alcoholic solution.

The 20,21-dihydroxy steroids produced by our ozonization procedure are readily converted to a 20-keto-21-hydroxy steroid by an Oppenauer oxidation, as this oxidation selectively oxidizes secondary alcoholic groups to keto groups, and does not oxidize primary alcoholic groups. For example, when 21-allo-pregnan-3β,20,21-triol 3-acetate, 1 gram, is dissolved in 10 cc. of acetone and 2 cc. of tertiary aluminum butylate in 30 cc. of benzene is added, and the mixture is heated to reflux for 6 to 8 hours, and the reaction product is then hydrolyzed with dilute sulfuric acid, the allo-pregnan-3β,21-diol-20-one 3-acetate is obtained in good yield. When Δ⁵-pregnen-3,20,21-triol is treated in exactly the same manner, Δ⁴-pregnen-21-ol-3,20-dione is obtained in good yield. The product of Example 4 can similarly be converted to a 20-one compound. The conditions required for an Oppenauer oxidation are well known; see U.S. patent to Oppenauer, No. 2,384,335. Any of the Oppenauer conditions set forth in that patent, or otherwise known to the art, may be used in oxidizing the 20-ol group to the 20-one group. All that is required is that the 20-hydroxy steroid be treated with an excess of an aldehyde or a ketone in the presence of a tertiary aluminum alcoholate or chloromagnesium alcoholate. The reaction is usually conducted at about 50 to 125° C. for 4 to 20 hours.

While the Oppenauer oxidation is the preferred method for selectively converting secondary hydroxyl groups to keto groups, it will be recognized that any other oxidizing procedures known to the art for selectively converting a 20-hydroxy steroid to a 20-keto steroid can be applied in the process of the present invention. For example, Sarett, J. Am. Chem. Soc., vol. 68, 2478 (1946) teaches a procedure for converting a Δ⁴-pregnen-20,21-diol-3,11-dione steroid to Δ⁴-pregnen-21-ol-3,11,20-trione acetate by selectively acetylating the 21-hydroxyl group and then carefully oxidizing the compound with chromic acid. A Δ⁴-pregnen-20,21-diol-3,11-dione can be produced by reacting Δ⁴-pregnen-3,11,20-trione according to the process of the present invention, and the 20,21-diol can then be converted to Δ⁴-pregnen-21-ol-3,11,20-trione acetate by using the identical procedure taught by Sarett. Similarly, the other 20,21-diol steroids prepared by the process of the present invention can be oxidized by following Sarett's procedure; e.g., allo-pregnan-3β,20,21-triol 3-acetate can be converted to allo-pregnan-3β,21-diol-20-one 3,21-diacetate.

Among the preferred group of steroids of the pregnane-20-one series which can be converted to 20,21-dihydroxy steroids and then to 20-keto-21-hydroxy steroids by our invention are those of the following formula:

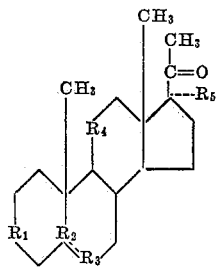

in which $R_1$ is $CH_2$, CHOH, an acyloxy substituted methylene group, the acyloxy radical having up to 8 carbon atoms, or a ketal substituted methylene group, $R_2$ is C, CH, or CX, and $R_3$ is $CH_2$, CHX, or CH, X being an iodine, bromine or chlorine atom, and $R_2$ and $R_3$ being linked by a single or double bond; $R_4$ is $CH_2$, CO, CHOH, or CHOR, R being an acyl group of up to eight carbon atoms; and $R_5$ is a hydroxyl group, hydrogen, or an acyloxy group of up to 8 carbon atoms. It will be recognized that some of the above compounds have asymmetric centers and can exist in different isomeric forms. Although it may be desirable to use a particular isomer because of the properties desired in the product, it is possible to use any of the isomeric forms in the process of the present invention; for example, the process is applicable to both pregnanes and allopregnanes, to 3α-hydroxy pregnanes and to 3β-hydroxy pregnanes. Of course, the process is also applicable to nor- and homo-pregnanes, e.g., 19-norpregnan-20-one.

Among the pregnane-20-one compounds which can be converted to pregnane-20-one-21-ol compounds by the process of our invention are: progesterone, pregnenolone, 17-hydroxyprogesterone, 17-hydroxypregnenolone, pregnanedione, 3-hydroxy-pregnane-20-one, Δ⁵-pregnen-3-ol-11,20-dione 3-acetate, Δ⁵-pregnen-3,17α-diol-11,20-dione 3-benzoate, pregnan-3-ol-11,20-dione 3-acetate, Δ⁵-pregnen-3,11-diol-20-one 3,11-diacetate, etc.

A group of compounds which react especially well in our process are the steroids of the pregnane-20-one series which contain only hydroxyl or acyloxy substituents, and which contain only non-conjugated nuclear unsaturation.

A convenient, efficient, and valuable method of converting steroids of the pregnane-20-one series to pregnane-21-ol-20-one derivatives via 21-arylidene and 20,21-diol intermediates has been described.

We claim:

1. A method of preparing 21-hydroxy-20-keto steroids of the pregnane-20-one series which comprises condensing a 17β-acetyl steroid with an aromatic aldehyde to prepare a 21-arylidene steroid, treating the 21-arylidene steroid with ozone to form an ozonide from the 21-double bond, decomposing the ozonide under reductive conditions to form a 20,21-dihydroxy steroid, and selectively oxidizing the dihydroxy steroid to form a 21-hydroxy-20-keto steroid.

2. A method of preparing 21-hydroxy-20-keto steroid compounds which comprises condensing a 17β-acetyl steroid of the pregnane-20-one series with a benzaldehyde in the presence of a basic catalyst to prepare a 21-benzylidene steroid, treating the 21-benzylidene steroid in an organic solvent with an excess of ozone at a temperature between the temperature of Dry Ice and 10° C., decomposing the resulting ozonide by treating it with a reducing agent selected from the group consisting of nascent hydrogen, catalytic hydrogen, potassium ferrocyanide, sodium bisulfite and lithium aluminum hydride and reducing the decomposed ozonide to a 20,21-dihydroxy steroid, and oxidizing the dihydroxy steroid under Oppenhauer conditions which comprise treating the said dihydroxy steroid with an excess of a compound from the group consisting of aldehydes and ketones in the presence of an alcoholate selected from the class consisting of the tertiary aluminum and chloromagnesium alcoholates, to produce the 21-hydroxy-20-keto steroid.

3. A method of preparing a 21-hydroxy-20-keto steroid which comprises taking an ozonide of a steroid of the pregnane-20-one series selected from the group consisting of the 21-arylidene-20-keto and the 21-furfurylidene-20-keto steroids of said series, the ozonide group being formed at the 21-double bond, and decomposing the said ozonide under reductive conditions and reducing the decomposed ozonide to a 20,21-dihydroxy steroid, and selectively oxidizing the 20,21-dihydroxy steroid to a 21-hydroxy-20-keto steroid.

4. A method of preparing 21-hydroxy-20-keto compounds which comprises condensing a 17β-acetyl steroid of the pregnane-20-one series with an aromatic aldehyde to form a 21-arylidene steroid, treating the 21-arylidene steroid with ozone to form an ozonide from the 21-double bond, decomposing the ozonide by treating it with zinc and acetic acid, then heating the decomposed ozonide in the presence of zinc and acetic acid, and selectively oxidizing the resulting 20,21-dihydroxy steroid to form a 21-hydroxy-20-keto steroid.

5. A method of preparing 20,21-dihydroxy steroids which comprises taking an ozonide of a steroid of the pregnane-20-one series selected from the group consisting of the 21-arylidene-20-keto and the 21-furfurylidene-20-keto steroids of said series, the ozonide group being formed at the 21-double bond, and decomposing the ozonide by treating it with zinc and acetic acid, and then heating the decomposed ozonide in the presence of zinc and acetic acid, and then separating a 20,21-dihydroxy steroid from the reaction mixture.

6. The method of claim 5 in which the ozonide is formed from 21-benzylideneallopregnan-20-one.

7. The method of claim 5 in which the decomposed ozonide is heated in the presence of zinc and acetic acid at 40 to 70° C. for 20 minutes to 3 hours.

8. A method of preparing 21-hydroxy-20-keto steroids of the pregnane-20-one series which comprises condensing a 17β-acetyl steroid with an aromatic aldehyde to prepare a 21-arylidene steroid, treating the 21-arylidene steroid with ozone to form an ozonide from the 21-double bond, decomposing the ozonide by treating it with a reducing agent selected from the group consisting of nascent hydrogen, catalytic hydrogen, potassium ferrocyanide, sodium bisulfite and lithium aluminum hydride to form a 20,21-dihydroxy steroid, and selectively oxidizing the dihydroxy steroid to form a 21-hydroxy-20-keto steroid.

9. A method of preparing a 21-hydroxy-20-keto steroid which comprises taking an ozonide of a steroid of the pregnane-20-one series selected from the group consisting of the 21-arylidene-20-keto and the 21-furfurylidene-20-keto steroids of said series the ozonide group being formed at the 21-double bond, and decomposing the said ozonide by the use of a reducing agent selected from the group consisting of nascent hydrogen, catalytic hydrogen, potassium ferrocyanide, sodium bisulfite and lithium aluminum hydride and reducing the decomposed ozonide to a 20,21-dihydroxy steroid, and selectively oxidizing the 20,21-dihydroxy steroid to a 21-hydroxy-20-keto steroid.

References Cited in the file of this patent

UNITED STATES PATENTS

| | | |
|---|---|---|
| 2,321,690 | Logemann | June 15, 1943 |
| 2,352,568 | Reichstein | June 27, 1944 |
| 2,437,564 | Serini | Mar. 9, 1948 |